United States Patent Office 3,391,223
Patented July 2, 1968

3,391,223
POLYESTERIFICATION REACTION PRODUCTS OF A POLYHYDRIC ALCOHOL AND A 3,4-DICARBOXY - 1,2,3,4 - TETRAHYDRO - 1 - NAPHTHALENESUCCINIC DIANHYDRIDE
Roland Ralph Di Leone, Rowayton, Conn., assignor to American Cyanamid Company, Stamford, Conn., a corporation of Maine
No Drawing. Continuation-in-part of application Ser. No. 266,081, Mar. 18, 1963. This application Jan. 3, 1967, Ser. No. 606,557
10 Claims. (Cl. 260—871)

ABSTRACT OF THE DISCLOSURE

Polyester resin compositions resulting from the polyesterification of a polyhydric alcohol with a 3,4-dicarboxy-1,2,3,4-tetrahydro-1-naphthalenesuccinic dianhydride.

Cross-references to related applications

This application is a continuation-in-part of my earlier application having the Ser. No. 266,081, filed Mar. 18, 1963, entitled, "Dianhydride Process and Derivatives Thereof." Reference is also made to my copending application having the Ser. No. 442,209, filed Mar. 23, 1965, entitled, "Addition of Maleic Anhydride to Vinyl Toluene via the Diels Alder Reaction To Form a Novel Dianhydride."

Background of invention

In my aforementioned patent application, I have disclosed a process for preparing 3,4-dicarboxy-1,2,3,4-tetrahydro-1-naphthalenesuccinic dianhydride comprising heat reacting styrene, and maleic anhydride in an atmosphere of nitric oxide. Among other disclosures, there are shown processes for preparing polyester resins from said 3,4-dicarboxy-1,2,3,4-tetrahydro-1-naphthalenesuccinic dianhydride by reacting the same with a polyhydric alcohol.

The field of the invention

The invention of the present application is in the field of polyester resin compositions made by esterifying a 3,4-dicarboxy-1,2,3,4-tetrahydro - 1 - naphthalenesuccinic dianhydride with a polyhydric alcohol and, preferably, with a dihydric alcohol so as to provide products which can be used as molding compositions with or without a filler, coating compositions to be applied from an aqueous medium or from an organic solvent medium or as laminating resins in which there is incorporated into the polyester resin one or more α,β-ethylenically unsaturated dicarboxylic acids so as to provide cross-linking sites when used in combination with polymerizable monomers such as styrene and diallyl phthalate, and the like.

Description of the prior art

The prior art is represented by the United States Patents 2,255,313 and 2,443,735–41, inclusive, as well as the Chemical Abstracts, vol. 50, 1956, columns 10058 and 10059. The latter publication shows a method of preparing the 3,4-dicarboxy 1,2,3,4-tetrahydro-1-naphthalenesuccinic dianhydride.

Summary of the invention

It is, therefore, one of the objects of the present invention to produce from 3,4-dicarboxy-1,2,3,4-tetrahydro-1-naphthalenesuccinic dianhydride polyesters by reacting it with a polyhydric alcohol. Still further, this invention relates to a polyester resinous composition which is useful as a molding composition to produce molded articles. A still further object of the present invention is to produce coating compositions using the polyester resin compositions of the present invention from solution. These and other objects of the present invention will be discussed in greater detail hereinbelow.

The compound 3,4 - dicarboxy - 1,2,3,4-tetrahydro-1-naphthalenesuccinic dianhydride will be referred to hereinbelow sometimes as tetralin dianhydride for the sake of simplicity and sometimes by the symbol "TDA" for the sake of brevity. As has been indicated hereinabove, the TDA is produced according to the process outlined in my parent application by forming a particular adduct of styrene and maleic anhydride by heat reacting these components in an atmosphere of nitric oxide. In carrying out the process, the maleic anhydride may be heated at a temperature between about 30° C. and 150° C. and, preferably, between about 50° C. and 110° C. during which time nitric oxide is forced through the maleic anhydride if the temperature is high enough to provide molten maleic anhydride or, alternatively, as a blanket over the maleic anhydride if said anhydride is in a solid state. When the maleic anhydride has been heated and contacted with the nitric oxide, monomeric styrene is then added and as the solution is formed between the maleic anhydride and the styrene the nitric oxide can then be bubbled through the solution so as to provide an intimate atmospheric contact of the nitric oxide with the maleic anhydride-styrene solution. As the heating step continues and the TDA is formed, it precipitates out of the solution as a solid material. This precipitating step continues until substantially all of the TDA is formed. In this reaction, two moles of maleic anhydride are reacted with one mole of styrene. For this reason, one will generally use a mole ratio of styrene to maleic anhydride of about 1:2, respectively. Ordinarily to insure the best yields, one would use a slight excess of the maleic anhydride such as about 10–20% over and beyond the stoichiometrical amount calculated to completely react with the styrene. Excess quantities of the styrene may also be used if desired particularly when the process is carried out at the lower temperatures, i.e., below the melting point of the maleic anhydride so as to provide a solvent for the maleic anhydride and a medium from which the desired product is precipitated.

Reference is again made to my copending application having the Ser. No. 442,209, filed Mar. 23, 1965, entitled "Addition of Maleic Anhydride to Vinyl Toluene via the Diels Alder Reaction To Form a Novel Dianhydride." In said latter application, there is shown that substituted tetralin dianhydride can be produced by the same process wherein there is used in the place of the styrene, an alkyl ring-substituted styrene such as vinyl toluene thereby producing the compound 3,4-dicarboxy-1,2,3,4-tetrahydro-6-(and 7)-methyl-1-naphthalenesuccinic dianhydride. Such substituted compounds will be referred to hereinbelow sometimes as alkyl-substituted tetralin dianhydride for the sake of simplicity and sometimes by the symbol alkyl-substituted TDA for the sake of brevity.

In preparing these alkyl-substituted TDA's, one may react the maleic anhydride with any one of the following alkyl ring-substituted styrenes: ortho-, meta-, para- methylstyrene, ortho-, meta-, para- ethylstyrene, ortho-, meta-, para- propylstyrenes, ortho-, meta-, para- butylstyrenes, ortho- amylstyrene, meta- hexylstyrene, paraheptyl styrenes, and the like.

The other essential reactants used to prepare the polyesterification reaction products of the present invention are the polyhydric alcohols, such as the glycols, including ethylene glycol, diethylene glycol, propylene glycol, dipropylene glycol, trimethylene glycol, tetramethylene glycol, and the like, and higher polyhydric alcohols such as glycerol, trimethylolpropane, pentaerythritol, dipentaerythritol, pinacol, adonitol, xylitol, arabitol, mannitol, and the like. When preparing the polyesterification reaction products of the present invention little or no difficulty is experienced when the dihydric alcohols are used, particularly when an excess of the dihydric alcohol is used so as to inhibit the tendency for cross-linking and subsequent premature gelation. However, when the polyhydric alcohols have more than two hydroxy groups, it is generally desirable and sometimes necessary to make use of a predetermined amount of monohydric alcohol in order to function as chain terminators and thereby prevent premature gelation by extensive cross-linking within the polymeric molecule. Among the monohydric alcohols which may be used are those containing between about 1 and 12 carbon atoms such as methanol, ethanol, propyl alcohols, butyl alcohols, amyl alcohols, octyl alcohols, lauryl alcohol, and the like.

Preferred embodiments

In order that the concept of the present invention may be more completely understood, the following examples are set forth in which all parts are parts, by weight, unless otherwise indicated. These examples are set forth primarily for the purpose of illustration and any specific enumeration of detail contained therein should not be interpreted as a limitation on the case except as is indicated in the appended claims.

Example 1

A blend of 300 parts of TDA and 144 parts of cyclohexane dimethanol is dissolved in 4000 parts of dry dioxane. The reaction mixture is stirred for several hours and is then heated to the reflux temperature and maintained at that temperature for about 4 hours. The reaction mixture, after cooling, is highly viscous. A film of the polymer was found to be hard and tough.

Example 2

144 parts of cyclohexane dimethanol and 111 parts of phthalic anhydride are reacted at 180–190° C. until all of the water of reaction is collected. The reaction mass is cooled to about 100–110° C. and 75 parts of TDA are added gradually. The reaction is continued at 100–110° C. for 3 hours after the addition is completed. The product produced is a hard, glassy material. A portion of this product is then ground with 5% of barium oxide and compression molded at 150° C. for 30 minutes. The finished molding is hard and solvent resistant. Another portion of the polyester resin is dispersed in water containing sufficient ammonium hydroxide to dissolve the polymer. To this solution is added 10%, by weight, of the hexamethyl ether of hexamethylol melamine. Films drawn down on a glass plate from this solution were air dried and then baked for 30 minutes at 150° C. to give films which are hard and solvent resistant.

In addition to the phthalic anhydride used hereinabove, other dicarboxylic acids free of non-benzenoid unsaturation can be used as modifiers for the TDA polyesters such as oxalic, malonic, succinic, glutaric, sebacic, adipic, pimelic, suberic, azelaic, tricarballylic, citric, tartaric, malic, and the like. If it is desired to incorporate a measure of polymerizable unsaturation into the polyester resin composition, one may use, with the TDA and the polyhydric alcohol, an $\alpha,\beta$-ethylenically unsaturated dicarboxylic acid, such as maleic, fumaric, aconitic, itaconic, and the like. When these unsaturated acids are used in the polyester resin compositions, they can be used with a cross-linking monomer such as styrene, diallyl phthalate, and the like. This class of polyester resin compositions is generally known and is shown in the U.S. Patents 2,255,-313; 2,443,735–41, inclusive, among others. These patents and their disclosures are incorporated herein in order to avoid unnecessary redundancies of well known prior art.

In preparing the unsaturated polyester resin compositions which is one of the preferred embodiments of the present invention, one must take into account the high functionality of the TDA compound used. This may be done either by replacing some of the glycol with a monohydric alcohol or by using an excess of the glycol or both. In order to determine the average functionality in a given system of unsaturated polyester resins containing a TDA compound, one needs to utilize the formula set forth hereinbelow for the recipe set forth immediately hereinbelow:

| | Moles |
|---|---|
| TDA | 1 |
| Maleic anhydride | 2 |
| 2,2,4-trimethyl-1,3-pentanediol | 6 |

$A=1$
$B=2$
$C=6$
Total number of moles $=9$
Eq. of COOH $=4A+2B=8$
Eq. of OH $=2C=12$ Average functionality:

$$\frac{\text{No. of Equivalents}}{\text{No. of Moles}}=\frac{20}{9}=2.22$$

Hydroxyl excess, percent:

$$\frac{\text{Eq. OH}-\text{Eq. COOH}}{\text{Eq. COOH}}\times 100=50\%$$

In order to illustrate the process for the preparation of such an unsaturated polyester resin, the following examples are set forth.

Example 3

Into a suitable reaction vessel equipped with stirrer, steam jacketed partial condenser, thermometer, inert gas inlet and outlet tube, and a heating mantle, there is introduced 2,628 parts of 2,2,4-trimethyl-1,3-pentanediol. The charge is heated and after this diol has melted, there is then introduced 588 parts of maleic anhydride and the total mixture is then brought to a temperature of about 90° C. There is then charged to the reaction mass at that temperature about 900 parts of unsubstituted TDA and the temperature is then brought to about 140° C., whereupon 8.2 parts of a 5% solution of hydroquinone in dibutylphthalate are added to the reaction vessel followed by 8.2 parts of dibutyltin oxide. A flow of carbon dioxide gas is then passed through the mixture while the temperature is maintained in the range of about 140° C.–150° C. while distilling water out of the system. The reaction is continued for a total period of approximately 24 hours while slowly raising the temperature to 190° C. There is thus produced a substantially colorless, viscous, liquid resin product which weighed 3,865 parts and had an acid number of 29. The polyester resin thus produced is dissolved in monomeric styrene in an amount of 65 alkyd, 35 styrene to which about 2% of benzoyl peroxide is added, and the total mixture was heated at elevated temperatures until a cure was achieved in a mold. The resultant molded object was transparent and hard.

Example 4

Into a suitable reaction vessel as used in Example 3, there is introduced 900 parts of unsubstituted TDA and 780 parts of 2-ethyl hexanol. The temperature is raised until the components had reacted forming a half ester of the TDA. This reaction required approximately one hour and the product produced was very viscous. Into a separate reaction vessel comparable to that used in Example 3, there are introduced 696 parts of fumaric acid and 912 parts of propylene glycol. There is then added 6.6 parts of a 5% solution of hydroquinone in dibutylphthalate and the temperature is raised slowly over a period of about 12 hours to 190° C. while distilling out water liberated in the esterification. The product is a fluid resin having an acid number of 9. These two separately prepared polyester resin products are then combined and reacted under conditions of esterification as described in Example 3. The reaction temperature is brought to 190° C. over a period of about 20 hours. The final acid number was 14. This resinous material is compatible with styrene and when catalyzed with tertiary butyl hydroperoxide and coated on a glass fiber cloth, it was cured at elevated temperatures and pressures to produce a laminated structure.

Example 5

Into a suitable reaction vessel substantially identical to that used in Example 3, there is introduced 2,628 parts of 2,2,4-trimethyl-1,3-pentanediol and as in Example 3 is heated until the diol melts. There is then added 882 parts of maleic anhydride. Finally, 900 parts of unsubstituted TDA is charged and the mixture is heated to form a clear liquid. Inert gas ($CO_2$) is introduced into the vessel and 8.8 parts of a 5% solution of hydroquinone in dibutylphthalate are added. The temperature is then brought to about 150° C. while maintaining the inert gas flow. An esterification catalyst, namely, dibutyltin oxide in an amount of 8.8 parts is then added. The esterification is continued over a period of about 20 hours. The ultimate product produced is a viscous resin having an acid number of 41. This resin is soluble in styrene and cures readily when conventional organic peroxide catalysts are used.

Example 6

Into a suitable reaction vessel comparable to that used in Example 3, but having in addition a dropping funnel, there is introduced 261 parts of maleic anhydride. The maleic anhydride is melted and then the system is swept out with nitric oxide gas. The temperature is raised to about 115°–120° C. and styrene is added in small increments through the dropping funnel until a total of 90 parts has been added. The reaction product is cooled and the nitric oxide gas is swept out with carbon dioxide. This reaction product composed of a mixture of unsubstituted TDA and maleic anhydride is then combined with 2,2,4-trimethyl-1,3-pentanediol and is converted to a polyester resin by the technique shown in Example 3 using comparable amounts of dibutyltin oxide and hydroquinone until a polyester resin alkyd having an acid number of 23 is produced. The resulting polyester is soluble in styrene and is cured readily with organic peroxide catalysts.

The TDA type polyester resins of the present invention may be made over a broad range of average functionality and hydroxyl excess. In general, it may be stated that as the average functionality is increased, the hydroxyl excess must also be increased to avoid gelation. It is estimated that the average functionality should not be more than 2.05 when there is no hydroxyl excess and not more than about 2.5 when the hydroxyl excess is 100%. Too much excess hydroxyl is undesirable since it tends to reduce water resistance. However, some excess hydroxyl is desirable since it gives the resin improved adhesion to glass fibers. A TDA type alkyd resin made with propylene glycol as the polyhydric alcohol will not be soluble in styrene. It will, on the other hand, be soluble in methyl methacrylate. This is also true of TDA type alkyds made with 1,3-butylene glycol.

I claim:
1. A polyester resin of a polyhydric alcohol and a dianhydride having the formula:

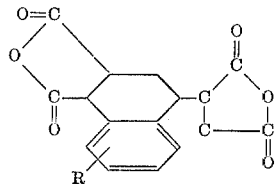

wherein R is a member of the group consisting of hydrogen and a alkyl group having from one to seven carbon atoms and wherein the average functionality is not more than about 2.05 when there is no hydroxyl excess and not more than about 2.5 when the hydroxyl excess is 100%.

2. The polyesterification reaction product according to claim 1 in which R is hydrogen.

3. The polyesterification reaction product of claim 1 in which R is a lower alkyl group containing from 1 to 7 carbon atoms.

4. The polyesterification reaction product according to claim 3 in which the alkyl group is methyl.

5. The polyesterification reaction product according to claim 1 which contains an $\alpha,\beta$-ethylenically unsaturated dicarboxylic acid reacted therein.

6. The polyesterification reaction product according to claim 5 in which the $\alpha,\beta$-ethylenically unsaturated dicarboxylic acid is maleic anhydride.

7. The polyesterification reaction product according to claim 5 blended with a polymerizable monomer containing a $CH_2=C<$ group.

8. The polyesterification reaction product according to claim 6 blended with a polymerizable monomer containing a $CH_2=C<$ group.

9. The polyesterification reaction product of claim 7 in which the polymerizable monomer is styrene.

10. The polyesterification reaction product of claim 7 in which the polymerizable monomer is diallyl phthalate.

References Cited
UNITED STATES PATENTS

| 3,066,114 | 11/1962 | Hagele et al. | 260—871 |
| 3,125,589 | 3/1964 | Yates | 260—75 |
| 3,271,476 | 9/1966 | Widmer et al. | 260—346.6 |
| 3,274,131 | 9/1966 | Leon | 260—2.5 |
| 3,284,470 | 11/1966 | Farber | 260—346.3 |

OTHER REFERENCES

Alder et al., Addition of Maleic Anhydride to Styrene, Chem. Abstracts, vol. 50, pp. 10058 and 10059 (1956).

MURRAY TILLMAN, *Primary Examiner.*

J. T. GOOLKASIAN, *Assistant Examiner.*